Nov. 5, 1940.                    J. H. FRIEDMAN                    2,220,517
                        CLUTCH CONTROL FOR BRAKING FLYWHEELS
                                Filed July 20, 1938
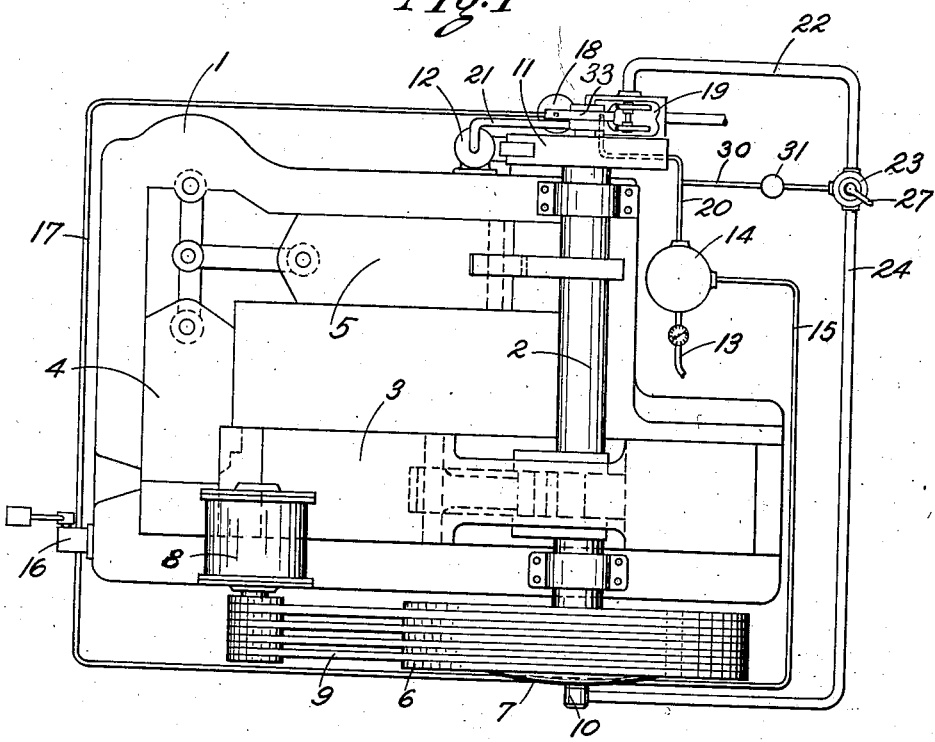
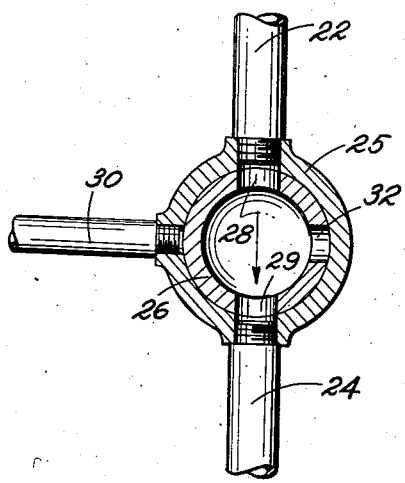
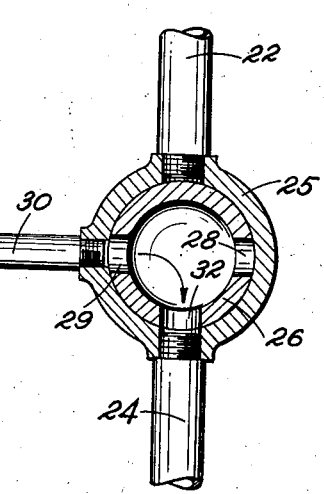
INVENTOR.
JOHN H. FRIEDMAN
BY Richey & Watts
ATTORNEYS Patented Nov. 5, 1940

2,220,517

UNITED STATES PATENT OFFICE 2,220,517

CLUTCH CONTROL FOR BRAKING FLYWHEELS

John H. Friedman, Tiffin, Ohio, assignor to The National Machinery Company, Tiffin, Ohio, a corporation of Ohio Application July 20, 1938, Serial No. 220,237

5 Claims. (Cl. 192—12)

This invention relates to clutches and brakes for heavy duty machinery such as forging machines, presses and the like, and particularly to an arrangement for stopping the flywheel when desired.

In forging machines, presses, and similar intermittently operating machinery, it is customary to provide a relatively heavy flywheel continuously driven by a motor, a clutch to couple the flywheel to a driven shaft of the machine to operate the machine, and a brake to stop the motion of the machine when the clutch is released. In many machines of this type friction clutches are employed and compressed air or liquid under pressure is used to apply the clutch and to release the brake, the brake being applied by a spring when the pressure of the fluid is released. Ordinarily in machines of this type the main shaft of the machine makes but a single revolution in each operation after the clutch has been engaged, at the end of which revolution a cam or the like automatically disengages the clutch and applies the brake. The work of the machine is commonly done by a reciprocating member which is heavily loaded only at one point in its stroke and a relatively heavy flywheel is used to store the energy of the motor and deliver the same to the machine during the period when the work is being done. In many instances, as when adjusting the machine, setting dies, or repairing or adjusting the clutch or other parts of the machine, it is desirable to stop the rotation of the flywheel and motor. When the clutch is disconnected and the power of the motor turned off, the flywheel runs or coasts freely until the energy which has been stored in it by the motor is dissipated, and because of the weight of the flywheel a relatively long period of time elapses before the flywheel and motor come to a stop. This delay is extremely undesirable when making adjustments requiring stopping of the flywheel, particularly where, as frequently occurs, it is necessary to start and stop the flywheel several times before the adjustment is completed.

The object of the present invention is to provide means for stopping the flywheel and motor in a machine of this type after the clutch has been disengaged and the motor turned off. This is accomplished with a friction clutch by disengaging the clutch, applying the brake to the machine, turning off the motor and then lightly reengaging the clutch to impose a frictional drag on the flywheel and rapidly bring the same to rest.

In the accompanying drawing which discloses one arrangement embodying the present invention:

Figure 1 is a plan view, somewhat diagrammatic, of a forging machine equipped with an air operated friction clutch and brake, and an auxiliary valve for stopping the flywheel;

Figure 2 is a section through the auxiliary valve showing the same in normal running position;

Figure 3 is a section corresponding to Figure 2 showing the valve turned to position to cause the clutch to function as a flywheel brake.

Referring to the drawing, the invention has been illustrated in connection with a forging machine embodying a bed frame 1, a crankshaft 2 journalled in the bed frame, a header slide 3 reciprocated by the crankshaft, and a grip die 4 driven by a grip die slide 5, likewise reciprocated by the crankshaft. As illustrated, a flywheel 6 housing an air operated friction clutch 7 is mounted directly upon the crankshaft 2. It will be understood, however, that the flywheel 6 and clutch 7 may be mounted upon a shaft geared to the crankshaft when desired or connected to the machine in any suitable way, and likewise that the clutch and flywheel may be separate units rather than a combined unit. The combined flywheel and friction clutch may be of the type illustrated in the patent to William L. Clouse, No. 2,143,861.

A motor 8 is mounted upon the frame and provided with a belt or belts 9 encircling the motor pulley and the periphery of the flywheel 6. It will, of course, be understood that the motor may be geared to the flywheel if desired or the power may be applied to the flywheel from any suitable source.

As disclosed in the aforesaid patent, the flywheel 6 is journalled upon the shaft 2 and encloses friction plates alternately keyed to the shaft and to the flywheel which are arranged to be pressed together by a piston encompassing the end of the shaft when air pressure is admitted through a suitable connection 10.

A shaft of the machine, which in the embodiment illustrated is the crankshaft 2, is likewise provided with a friction brake 11 which is arranged to be applied by a spring and released by air pressure admitted to a cylinder 12. This brake may be of the construction disclosed in the patent to William L. Clouse No. 2,109,940 and the cylinder for operating the same may be of the construction disclosed in the patents to William L. Clouse No. 2,149,044 and No. 2,192,734. A supply line 13 leads from a source of pressure fluid, generally compressed air, and in order to avoid excessive pressure fluctuations is preferably connected to a reservoir 14. A pipe 15 leads from the reservoir 14 to a trip valve 16 located in any convenient position in front of the machine, and a pipe 17 from the trip valve leads to a cylinder 18 for operating the main control valves 19 for the clutch and brake. The construction and arrangement of these parts is preferably as disclosed in the said No. 2,192,734. The arrangement of the trip valve 16 and the main control valves 19 is such that when the trip valve is opened air pressure is admitted to the cylinder 18 which opens valves leading to both the brake and the clutch, preferably with the brake valve being opened first and the clutch valve then being opened after a short interval. Pressure fluid passes from the reservoir 14 through a pipe 20 to the main control valves 19 and when these valves are opened is admitted through the pipe 21 to the cylinder 12 to release the brake against the force of the spring holding the same engaged, and is then admitted through the pipe 22, auxiliary valve 23, pipe 24 and the connection 10 to the friction clutch 7 to engage the friction plates of the same and couple the flywheel to the shaft 2. At the conclusion of one revolution of the crankshaft 2 a cam 33 closes the main control valves 19, disconnecting the pipes 21 and 22 from the supply of pressure fluid and opening the same to atmosphere, thereby disengaging the clutch 7 and applying the brake 11 as disclosed in the said No. 2,192,734.

The auxiliary valve 23 embodies a casing 25 and a rotor 26 which may be controlled in any suitable way, as by a handle 27. The rotor is provided with ports 28 and 29 which align with the pipes 22 and 24 so that in the normal running position of the valve, as illustrated in Figure 2, the pipes 22 and 24 are in direct communication with each other.

A by-pass pipe 30 leads from the pressure fluid supply at any convenient location, as by being connected to the pipe 20, and opens into the casing 25 of the valve 23. Preferably a reducing valve 31 is disposed in the pipe 30, although as will be understood this valve may be omitted if desired. In the valve arrangement shown the rotor 26 of the valve 23 is provided with a third port 32. In the normal running position of the valve as illustrated in Figure 2 the port 32 is closed by the casing 25 and the pipe 30 opening through the casing is closed by the wall of the rotor 26. When the valve rotor 26 is turned in a clockwise direction from its normal running position as illustrated in Figure 2, the port 28 moves out of registration with the pipe 22, and the rotor 26 closes this pipe. At the same time the port 29 moves into registration with the pipe 30 and the port 32 moves into registration with the pipe 24, thereby admitting pressure fluid from the by-pass pipe 30 into the pipe 24 leading through the connection 10 to the clutch 7.

When the machine is operating the auxiliary valve 23, as previously described, is positioned as shown in Figure 2 so as to connect the pipes 22 and 24. When the trip valve 16 is operated the main control valves 19 admit pressure fluid to the brake cylinder 12, releasing the brake, and then to the clutch 7, engaging the clutch. At the conclusion of the desired cycle of operation the main control valves 19 are automatically closed, shutting off the pressure fluid supply line 20 and exhausting the pressure fluid which has been admitted to the brake cylinder 12 and the clutch 7. The spring thereupon again engages the brake 11, stopping the rotation of the shaft 2 and the flywheel turns freely upon the now stationary shaft 2. Should it be desired to stop the flywheel and motor the switch controlling the motor is opened and the valve 23 is turned to the position illustrated in Figure 3. Pressure fluid is then admitted through the by-pass 30 and the pipe 24 to the clutch causing frictional engagement of the series of clutch plates connected respectively to the flywheel and the shaft 2. Since the shaft 2 is held against rotation by the brake 11, the frictional force exerted by the clutch quickly brings the flywheel 6 and motor 8 to a stop. When it is desired to again operate the machine in the normal way the valve 23 is returned to its normal running position as illustrated in Figure 2 at which time the pressure fluid which has been admitted to the clutch 7 through the pipe 24 is exhausted through the pipe 22 and the main control valves 19 and the machine is again ready for normal operation.

It will be understood, of course, that any suitable form of valve mechanism may be employed as the auxiliary valve 23 and likewise that the desired restriction in the flow of pressure fluid from the pipe 30 to the pipe 24 may be obtained by simply using smaller ports or by opening the valve only a slight amount, instead of using the reducing valve 31. A reduced pressure or restricted flow through the pipes 30 and 24 is desired in order to prevent too sudden a stopping of the flywheel and motor and also to avoid any danger of injury to the friction plates of the clutch. Many other variations and modifications may be resorted to without departing from the scope of the invention as defined in the following claims.

I claim:

1. In a machine having a driven shaft, a flywheel, a friction clutch for coupling the flywheel to the driven shaft, fluid means for engaging the clutch, and a brake for stopping the rotation of the driven shaft, means for releasing the brake and for admitting pressure fluid to the operating means for the clutch to engage the same and rotate the driven shaft, and means for admitting pressure fluid to the operating means for the clutch while the brake is engaged to stop the rotation of the flywheel.

2. In a machine having a driven shaft, a flywheel, a friction clutch for coupling the flywheel to the driven shaft, pneumatic means for operating the friction clutch, a friction brake for stopping the rotation of the driven shaft, and pneumatic means for releasing the brake, the combination of valve means for admitting compressed air to the operating means for both said clutch and said brake so as to release the brake and engage the clutch, and separate valve means for admitting compressed air to the operating means for the clutch alone so as to apply an engaging force to the clutch without releasing the brake.

3. In a machine having a driven shaft, a flywheel, a friction clutch for coupling the flywheel to the driven shaft, means for engaging the clutch and a brake for stopping the rotation of the driven shaft, the combination of means for releasing the brake and engaging the clutch, and other means for engaging the clutch while the brake is engaged and the driven shaft is stationary to stop the rotation of the flywheel.

4. In a machine having a driven shaft, a flywheel, a friction clutch for coupling the flywheel to the driven shaft, a brake for stopping the rotation of the driven shaft and automatic means for disengaging the clutch and applying the brake at a predetermined point in the rotation of the driven shaft, the combination of manually operable means for releasing the brake and engaging the clutch to initiate rotation of the driven shaft and other manually operable means for engaging the clutch while the brake is engaged and the driven shaft is stationary to stop the rotation of the flywheel.

5. In a machine having a driven shaft, a flywheel, a friction clutch for coupling the flywheel to the driven shaft, fluid pressure means for engaging the clutch, a brake for stopping the rotation of the driven shaft, fluid pressure means for releasing the brake, a source of pressure fluid and control valve means for admitting pressure fluid from said source to both of said fluid pressure means to release the brake and engage the clutch and for releasing the fluid pressure to release the clutch and engage the brake, the improvement consisting of a by-pass leading to said source of fluid pressure and a manually operable three-way valve arranged in one position to connect the fluid pressure operating means for the clutch to said by-pass and disconnect the same from the control valve means and in another position to connect the fluid pressure operating means for the clutch to the control valve means and disconnect the same from said by-pass.

JOHN H. FRIEDMAN.